(12) United States Patent
Phelps, Sr.

(10) Patent No.: US 12,129,813 B1
(45) Date of Patent: *Oct. 29, 2024

(54) POWER PLANT CYCLE USING RENEWABLE ENERGY FACILITATED BY A SUPERSONIC SHOCK WAVE COMPRESSOR APPARATUS

(71) Applicant: Calvin E. Phelps, Sr., Easton, PA (US)

(72) Inventor: Calvin E. Phelps, Sr., Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,815

(22) Filed: Apr. 12, 2024

Related U.S. Application Data (63) Continuation-in-part of application No. 18/433,518, filed on Feb. 6, 2024, which is a continuation-in-part of application No. 18/522,482, filed on Nov. 29, 2023.

(60) Provisional application No. 63/466,492, filed on May 15, 2023.

(51) Int. Cl.
| | |
|---|---|
| *F02K 7/10* | (2006.01) |
| *F02C 1/08* | (2006.01) |
| *F02C 1/10* | (2006.01) |
| *F04D 21/00* | (2006.01) |

(52) U.S. Cl.
CPC .................. *F02K 7/10* (2013.01); *F02C 1/08* (2013.01); *F02C 1/10* (2013.01); *F04D 21/00* (2013.01); *F05D 2220/10* (2013.01); *F05D 2220/76* (2013.01)

(58) Field of Classification Search
CPC ...... F02C 6/00; F02C 1/08; F02C 1/10; F02C 1/05; F01D 19/00; F01D 25/00; F04D 21/00; F01K 27/00; F03G 4/00; F03G 4/001; F03G 4/02; F03G 4/029; F03G 6/00; F02K 7/10
See application file for complete search history.

(56) References Cited

U.S. PATENT DOCUMENTS

| | | | |
|---|---|---|---|
| 2012/0087779 A1* | 4/2012 | Vysohlid | F04D 21/00 415/151 |
| 2014/0341706 A1* | 11/2014 | Lardy | F04D 25/0686 415/206 |
| 2016/0281727 A1* | 9/2016 | Lardy | F04D 13/06 |
| 2017/0350318 A1* | 12/2017 | Williams | F02C 3/04 |
| 2019/0170025 A1* | 6/2019 | Phelps, Sr. | F25B 9/06 |
| 2020/0182095 A1* | 6/2020 | Cirucci | F28D 20/0034 |

\* cited by examiner

*Primary Examiner* — Thomas P Burke
(74) *Attorney, Agent, or Firm* — James R. M. Daniel (57) ABSTRACT

A new power plant cycle facilitated by an innovative vapor compression apparatus to repressurize the air vapor and generate renewable energy for heat input to the cycle. The new cycle can be used in place of the conventional low efficiency Rankine cycle or other cycles to provide economical production of electricity without air pollution. The new cycle can also be used on-board land-based vehicles, aircraft, and watercraft to power them electrically or mechanically, or be used in a package unit for supplying electricity and controlling temperatures of indoor homes, business, and other structures. The new cycle can be used in Ramjet aircraft applications.

26 Claims, 7 Drawing Sheets

FIG. 2
BASIC CYCLE FLOW DIAGRAM

FIG. 3

FIG. 4
On-board Electric Power for Battery Charging or to Power the Electric Motor

FIG. 4A
Direct Drive for Land-Based Vehicles, Aircraft, or Watercraft

FIG. 4B
Stationary Electricity and Temperature Control

FIG. 5
AIRCRAFT APPLICATION

POWER PLANT CYCLE USING RENEWABLE ENERGY FACILITATED BY A SUPERSONIC SHOCK WAVE COMPRESSOR APPARATUS

CROSS-REFERENCE TO RELATED APPLICATION

This application is a continuation-in-part of U.S. patent application Ser. No. 18/433,518, filed on Feb. 6, 2024, which is a continuation-in-part of U.S. patent application Ser. No. 18/522,482, filed on Nov. 29, 2023, which claims benefit of U.S. Patent Application No. 63/466,492, filed on May 15, 2023, the disclosures of which are hereby incorporated by reference in their entirety to provide continuity of disclosure to the extent such disclosures are not inconsistent with the disclosure herein.

FIELD OF THE INVENTION

The disclosed novel power plant cycle is facilitated by an innovative renewable energy produced by an innovative vapor compression apparatus; thereby facilitating a novel method for the production of electricity and mechanical work.

The renewable energy source consists of a compression apparatus that is innovatively adapted to stationary service from Ramgen aircraft supersonic shock wave compression (SSWC) technology. The air compression apparatus consists of a velocity choking device, a divergent duct, and a supersonic wave compressor (SSWC). The SSWC is currently used to compress combustion air in aircraft jet engines during supersonic flight, wherein the incoming air must be flowing at or above Mach 1 velocity to activate SSWC compression. The Ramgen jet engine is equipped with a device to obstruct the incoming air flow such as a cone or wedge shape, and when the supersonic velocity air flow impinges on the air inlet cowl and angled surface of the obstruction device, shock waves are created that instantaneously and non-isentropically compress the air passing through them.

As mentioned above, supersonic shock wave compressors compress the combustion air for in-flight supersonic and hypersonic aircraft based on Ramjet technology. When the aircraft exceeds the speed of sound and the flow of incoming combustion air to the engines exceeds supersonic velocity, the impinging air onto the inlet cowl and cone or wedge creates shock waves; thereby, additively compressing the air with each of the oblique shock waves and when encountering subsonic velocity air flow after a normal shock wave at the throat prior to entering the downstream flow. Advancements in these aircraft engine designs now include adjustable air inlet cowls and more complex cone or wedge surfaces to generate multiple oblique shock waves, along with axially adjustable cones or wedge angles to optimize production of oblique sonic waves and compression, and to provide turndown capabilities. Since these aircraft do not use a rotary compressor, the magnitude of compression is dependent on the entering air velocity, which must be greater than the speed of sound (c), or Mach number (M) greater than 1. Higher air inlet Mach number velocities produce higher compression.

In one embodiment of the present invention, the compression apparatus disclosed for the power plant cycle of the present invention includes a conventional supersonic wave compressor (SSWC) which is currently used to compress combustion air in supersonic aircraft engines while the aircraft is flying. A unique aspect of the present invention is that to facilitate compression by the SSWC in a stationary power plant, a choke valve or other conventional velocity choking device is located upstream of the SSWC to transition the gas flowing at subsonic velocity to supersonic velocity entering the SSWC in order to simulate aircraft speed greater than Mach 1. The choke valve uses a cylindrical or rectangular shaped plug with a cage around the plug that includes one or more exit ports consisting of convergent-divergent (CD) nozzles. Also, in another embodiment of the present invention, the plug travel is controlled to provide port openings that can be used to control choke velocity in relation to gas flow: thereby, continuously transitioning the gas entering the SSWC to supersonic velocity. A still another unique aspect of the present invention is that if one compression apparatus set, comprised of a choke valve, connecting divergent pipe, and a SSWC, does not adequately compress the gas to the desired pressure, additional sets can be installed in series, as necessary.

The heat input to the cycle is from a renewable energy facilitated by a novel compression apparatus in the power loop with a conventional compressor in the startup loop thereby providing compressed air to the compression apparatus, Other renewable energy or conventional source heat inputs can be used, as well.

A unique aspect of the present invention is that land-based electric vehicles, and watercraft and some aircraft would not require internal combustion engines in order to provide safe, economical transportation, thereby reducing their impact on the environment.

A still another unique aspect of the present invention is that power plant cycles in stationary power plants with supersonic shock wave compression apparatus would provide economical production of electricity and air pollution from fossil fuel plants would be reduced to a small fraction of that currently is produced. Power plants with carbon capture and sequestration (CCS) can benefit from this invention to make CCS economically viable.

BACKGROUND OF THE INVENTION

In 2008, the U.S. Department of Energy partnered with Ramgen Power Systems and the Dresser-Rand business in a co-funding project to adapt Ramjet flight-based SSWC to a stationary application for CCS that required large $CO_2$ compression ratios to increase the pressure near atmospheric pressure to about 2200 psia. Supersonic shock wave compression was proven successful by the project with the use of a specially designed, high speed rotating impeller to create shock waves in the stream of carbon dioxide ($CO_2$) flowing in at subsonic velocity which compressed the air from about 20 psia to 240 psi, or at a 12:1 compression ratio. The test resulted in compression power savings and in beneficial heat recovery, but the rotating impeller consumed a significant amount of auxiliary power. Therefore, it would be desired if the compression apparatus did not use a rotating impeller to consume power. Furthermore, it would be desired if the CCS was more economically viable by using a compression apparatus downstream of a conventional compressor to enable compression by the compression apparatus to the pressure required for transport and storage without consuming auxiliary power.

The above-mentioned features and steps of the invention and the manner of attaining them will become apparent, and the invention itself will be best understood by reference to the following description of the embodiments of the inven-

BRIEF SUMMARY OF THE INVENTION

In one embodiment of the present invention, the power plant cycle (C) uses a renewable energy consisting of a novel vapor compression apparatus to provide renewable energy and generate a net work output. The novel renewable energy source is facilitated by a supply of pressurized air from a conventional compressor during startup. In particular, the novel compression apparatus includes a supersonic shock wave compressor (SSWC). As discussed above, since the SSWC requires the entering air to be at or above supersonic velocity, the SSWC is adapted to stationary service by including a velocity choking device and divergent duct to provide supersonic velocity air to the SSWC to facilitate compression and renewable energy.

In general, the basic power plant cycle consists of a startup loop and a power loop. The startup loop portion of the power plant cycle consists of one stream of compressed atmospheric air providing mass flow and a starting pressure to the power loop starting at the mix header combining with air returning from the turbine. However, it is to be understood that any suitable heat trapping gas that performs similarly to air can also be used.

DETAILED DESCRIPTION OF THE INVENTION

Figure 1:
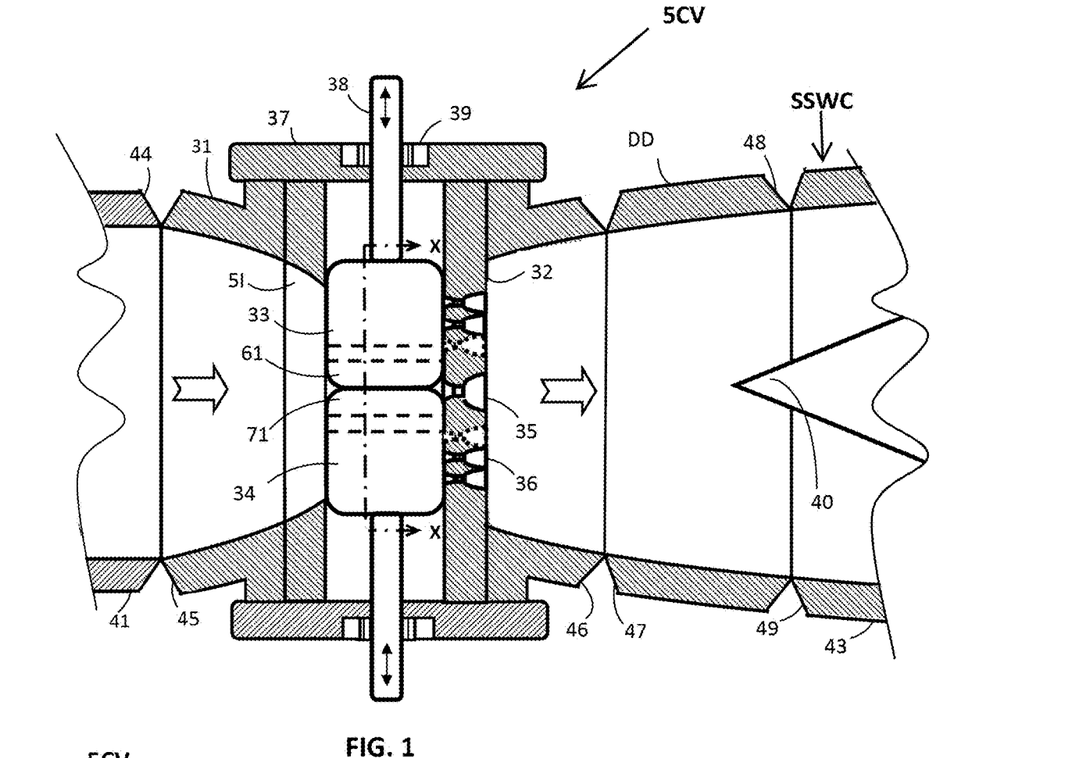
FIG. 1 is a cutaway view of a compression apparatus to highlight the velocity chocking valve, according to one embodiment of the present invention.

With respect to the flow diagrams in FIGS. 2, 4, 4A, 4B, and 5, FIGS. 1, 1A, and 1B depict a velocity choking valve labeled as control valve 5CV. In particular, FIG. 1 depicts the valve body 31 and the internals consisting of cage 32 and two opposing plugs 33 and 34. Cage 32 is constructed with an inlet gas flow opening 51 and exit openings consisting of center CD nozzles 35 and surrounding CD nozzles 36. Downstream of cage 32, valve body 31 and divergent duct DD cross-sectional areas are expanding without internal obstructions to avoid creation of shock waves to cause loss of velocity and allowing the supersonic velocity to further increase before encountering the leading edge 40 of the supersonic shock wave compressor (SSWC) cone.

A CD nozzle 35, 36 isentropically expands a gas/vapor flowing at subsonic velocity to supersonic velocity with Mach 1 throat velocity. The CD nozzles 35 and 36 can have various shapes and lengths. The seats of the double plugs 33 and 34 can have various contours to provide balanced flow paths to the SSWC cone over the load range. SSWC is currently used in-flight technology, but the velocity choking valve depicted in FIG. 1 and the divergent duct DD are new renovations to provide a method to adapt in-flight SSWC technology to stationary compression service.

Figure 1A:
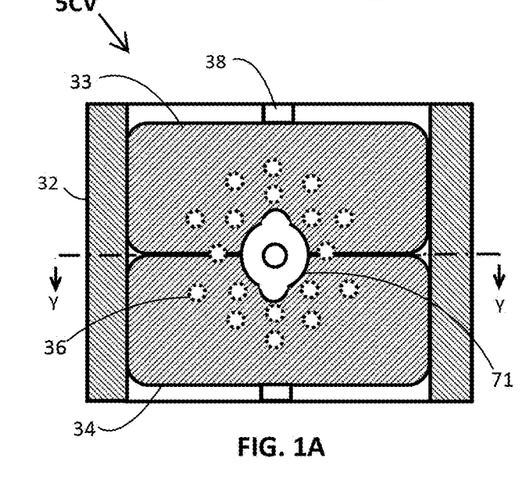
FIG. 1A is a cross-sectional view of the velocity chocking valve, taken along lines X-X in FIG. 1, according to one embodiment of the present invention.
Figure 1B:
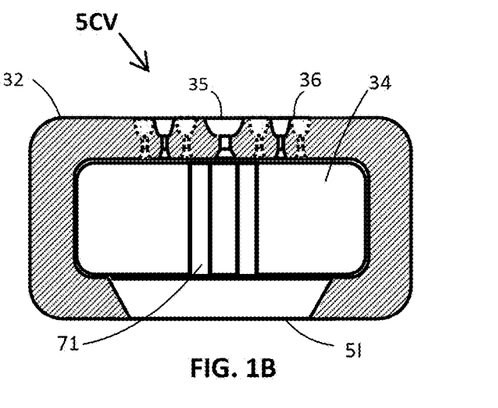
FIG. 1B is another cross-sectional view of the velocity chocking valve, taken along lines Y-Y in FIG. 1A, according to one embodiment of the present invention.

With respect to FIG. 1, FIG. 1A is taken vertically through plugs 33 and 34. With respect to FIG. 1A, FIG. 1B is taken horizontally through FIG. 1A at the seats of plugs 33 and 34. If a CD nozzle design requires more length, cage 32 wall thickness can be increased or a nozzle plate (not shown) can be attached to cage 32 to extend nozzles 35 and 36. As an alternative to the nozzle plate, part of each nozzle can be individually welded to the outside surface of cage 32. All inside surfaces of CD nozzles 35 and 36 should be smooth and metal cladding (not shown) can be applied to provide smoothness and also material that is resistant to corrosion or erosion.

Valve body 31 is a gate type with weld-ends, opposing access bonnets 37, and a straight-through gas flow direction from the inlet through cage opening 51, across seat plugs 33 and 34, and through CD nozzles 35 and 36 to the outlet. Plugs 33 and 34 have minimum gas flow openings 61 and 71. CD nozzle 35 in the center of the cage 32 is larger than the other nozzles 36 to provide a minimum gas flow for the lower compression range of the compression assembly. The other nozzles 36 are arranged in a circular pattern around the center nozzle 35 to provide balanced circumferential flow to the SSWC cone (shown with leading edge 40) when the plugs are automatically controlled in opposite directions by the attached valve stems 38 and connected valve operators (not shown). The plugs are controlled to expose CD nozzles 36 to maintain Mach 1 velocity in each of the throats over a load range in direct relation to gas flow changes. Packing glands 39 are depicted to indicate pressure sealers are required for stems 38.

The inlet duct 41 weld-end 44 connects to valve body 31 weld-end 45. Weld-end 47 on divergent duct DD connects to weld-end 46 on body 31. Weld-end 48 on divergent duct DD connects to the supersonic shock wave compressor body 43 at weld-end 49. Weld protrusions should be avoided and smooth inside surfaces should be provided to avoid creating shock waves and slowing the gas velocity. The point of the leading edge 40 of the compression cone is aligned with the center of CD nozzle 35.

Now attention is drawn to FIGS. 2, 4, 4A, and 4B which illustrate the cycle (C) in flow diagrams to produce electricity or mechanical power with the novel renewable energy provided by the compression apparatus. It is to be understood that the power plant cycle depicted on the figures uses light weighted solid lines for the startup loop portion, heavier weighted solid lines for the power loop portion, and heavy weight dotted lines for the wiring.

Figure 2:
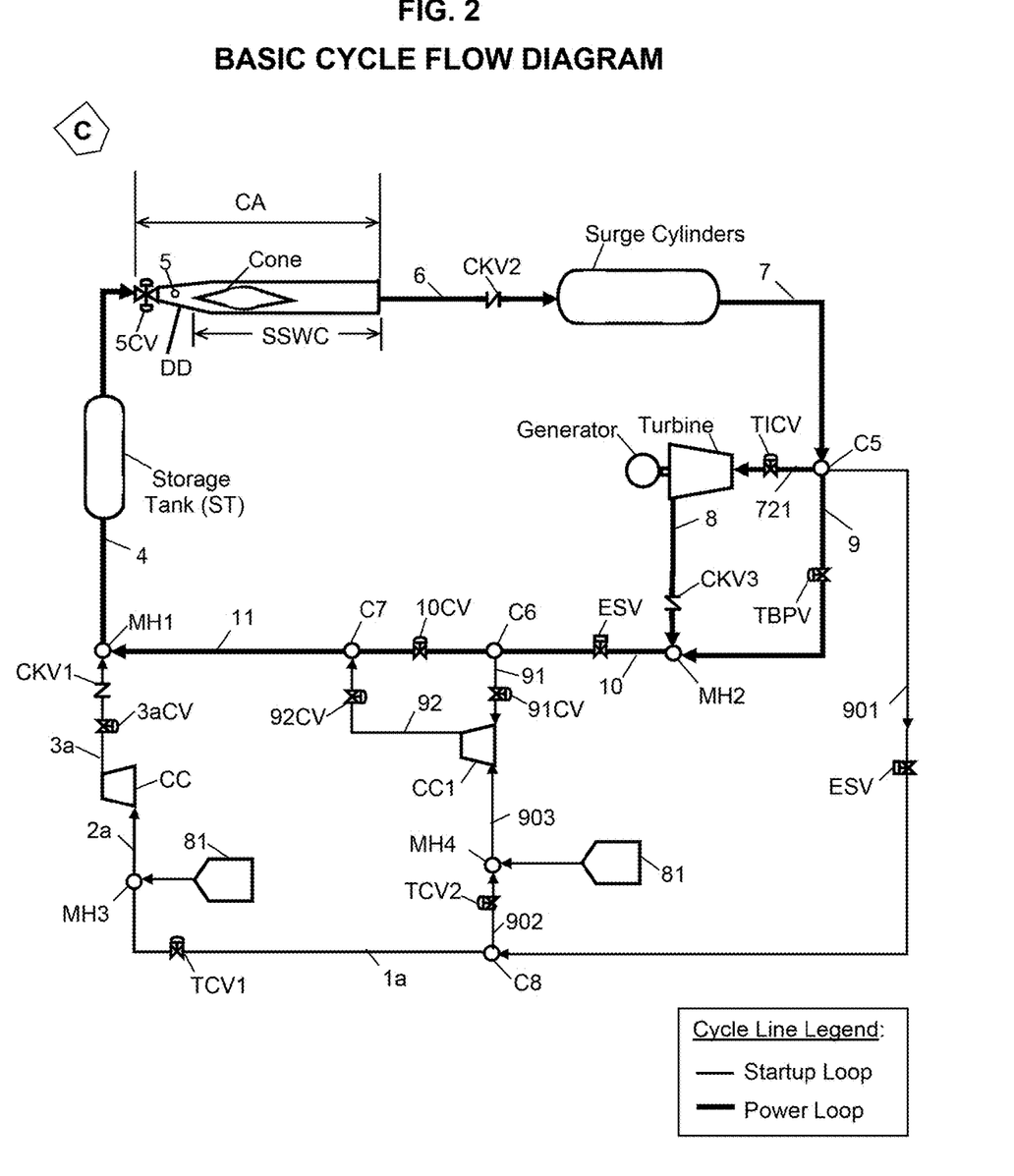
FIG. 2 is a basic cycle power plant flow diagram, according to one embodiment of the present invention.

FIG. 2 illustrates the basic cycle in which a source of atmospheric air labeled 81 is used as the heat trapping gas. The startup loop consists of conventional compressor CC intake pipe 2a, CC, outlet of CC through line 3a, control valve 3aCV, and check valve CKV1 to mixing header MH1 for charging the power loop with atmospheric air flow and pressure. Intake pipe 2a is part of a heating loop to ensure that CC inlet air temperature is kept above a minimum operating temperature of 50° F. The heating loop consists of drawing atmospheric air 81 into mix header MH3 to mix with hot air from header connection C5 through line 901, emergency stop valve ESV, connecting header C8, line 1a, and CC inlet air temperature control valve TCV1. When air tempering is required in line 10 from the turbine or TBPV in the power loop, the heating loop similarly heats the inlet air of conventional oil-free centrifugal compressor CC1 with atmospheric air 81 drawn into mix header MH4 to mix with hot air from header connection C8 through lines 902, 903 and air temperature control valve TCV2. The tempering air is then routed to header connection C7 through line 92 and control valve 92CV to mix with the air in line 10 and reduce the temperature in line 11.

The power loop starts at MH1 wherein the flow returning from the turbine is mixed with the startup flow. From MH1 the flow is routed through line 4 and storage tank (ST) to the inlet of the compression apparatus (CA) at velocity choking device 5CV. Point 5 is located inside the divergent duct DD in which supersonic velocity flow is directed to the SSWC. From CA, the flow is routed through line 6 and check valve CKV2 to surge cylinders and then through line 7 to connecting header C5. Before air conditions are suitable for admission to the turbine through turbine inlet control valve TICV, the flow is diverted through line 9 and a turbine bypass valve TBPV to mixing header MH2 in which any flow from the turbine is mixed. From MH2 the flow is returned to MH1 through line 10, emergency stop valve ESV, header connection C6, control valve 10CV, header connection C7 and line 11. After holding at a base load or full load, the startup loop is idle and can be removed from service. The power loop does not include an indirect heat exchanger for cooling the air leaving the turbine, since cooling will be conducted by direct tempering with atmospheric air from CC at MH1 or CC1 at header connection C7.

The compression apparatus (CA), providing renewable energy to the power loop, includes a velocity choking device at the inlet, such as a choke valve (5CV), to control the critical pressure ratio and Mach 1 throat velocity to transition the entering stream velocity from subsonic to supersonic velocity. The velocity choking device outlet stream flows at supersonic velocity into a divergent duct DD that allows the velocity to increase more before flowing into the connected inlet of the SSWC to facilitate compression. The SSWC can use a cowl at the inlet to direct shock waves onto an angled surface, such as a cone, for creating shock waves and compression. The cowl may be adjustable and the cone may have axially adjusted positions to increase the turndown range of the compression apparatus and optimize compression. The SSWC is a conventional device and forms the compression apparatus with the velocity choking device (5CV) and the connecting divergent duct (DD). A unique aspect of the compression apparatus is that it adapts a SSWC designed for compression of combustion air in moving supersonic aircraft engines to stationary compression service.

The power loop mass flow is increased until choke velocity is achieved in the throat of the 5CV at the minimum plug position to enable supersonic velocity to the SSWC to activate compression. The flow velocity in line 4 is subsonic (M<1) and the 5CV is controlled for a CD nozzle throat choke velocity (M=1) to transition the outlet to supersonic velocity (M>1). The compression apparatus should compress the vapor to the turbine set point pressure and temperature. Otherwise, one or more compression apparatus should be located in series downstream of the first compression apparatus. If a greater compression apparatus turndown range is required, one or more compression apparatus may be installed in parallel.

Before the compression apparatus facilitates compression in the power loop, conventional compressor CC1 restores pressure to the cycle equivalent to the power loop pressure loss and the 5CV pressure reduction to control Mach 1 velocity. With 10CV closed, CC1 receives vapor from header connection C6 in line 10 through line 91 and control valve 91CV. From CC1, the vapor is returned to the power loop through line 92, control valve 92CV, and header connection C7. After the compression apparatus compresses vapor as designed, CC1 can be transitioned from service by opening 10CV and closing 91CV and 92CV.

A unique aspect of the present invention is that the renewable energy stationary power plant shown in FIG. 2 includes a startup loop, wherein the startup loop provides a stream of atmospheric air for a mass flow and a starting pressure, and heat input from a renewable energy to a power loop that is operatively connected to the startup loop, and wherein the startup loop continues increasing the mass flow to a vapor compression apparatus.

The basic power loop in FIG. 2 consists of one or more storage tanks, a compression apparatus, surge cylinders, and a turbine-generator set. The vapor compression apparatus includes a velocity choking device with an outlet divergent duct connected to the inlet of the SSWC. Before the compressor apparatus facilitates compression in the power loop, a second conventional compressor (CC1) in the startup loop restores pressure to the cycle equivalent to the power loop pressure loses and the choking device pressure reduction required to control Mach 1 throat velocity. After the compressor apparatus compresses vapor as designed, the second conventional compressor can be transitioned from service. The startup conventional compressors maintain the pressure in the power loop storage tank located upstream of the compression apparatus to a pressure level required by the velocity choking device to transition the air velocity from subsonic to supersonic. A control valve downstream of the storage tank continues increasing the mass flow to the vapor compression apparatus until compression is facilitated within the vapor compression apparatus: thereby, achieving the power loop minimum range of operation.

With respect to the power loop, the power loop includes a vapor compression apparatus CA to provide renewable energy and turbine operating conditions, wherein the vapor compression apparatus CA includes a velocity choking device 5CV and divergent duct located upstream of an adjustable supersonic shock wave compressor (SSWC) wherein the velocity choking device 5CV isentropically expands and transitions air flowing at a subsonic velocity to a supersonic velocity for entering the divergent duct and SSWC. The power loop also includes a surge cylinder, wherein the surge cylinder is operatively connected to the vapor compression apparatus CA such that the surge cylinder maintains a sufficient volume of compressed air to minimize pressure fluctuations and large pressure and thermal shocks to a turbine. Finally, the power loop includes a turbine (Turbine), wherein the turbine is operatively connected to the surge cylinder such that the turbine isentropically expands the air to produce electricity with a shaft-connected generator (Generator).

Figure 3:
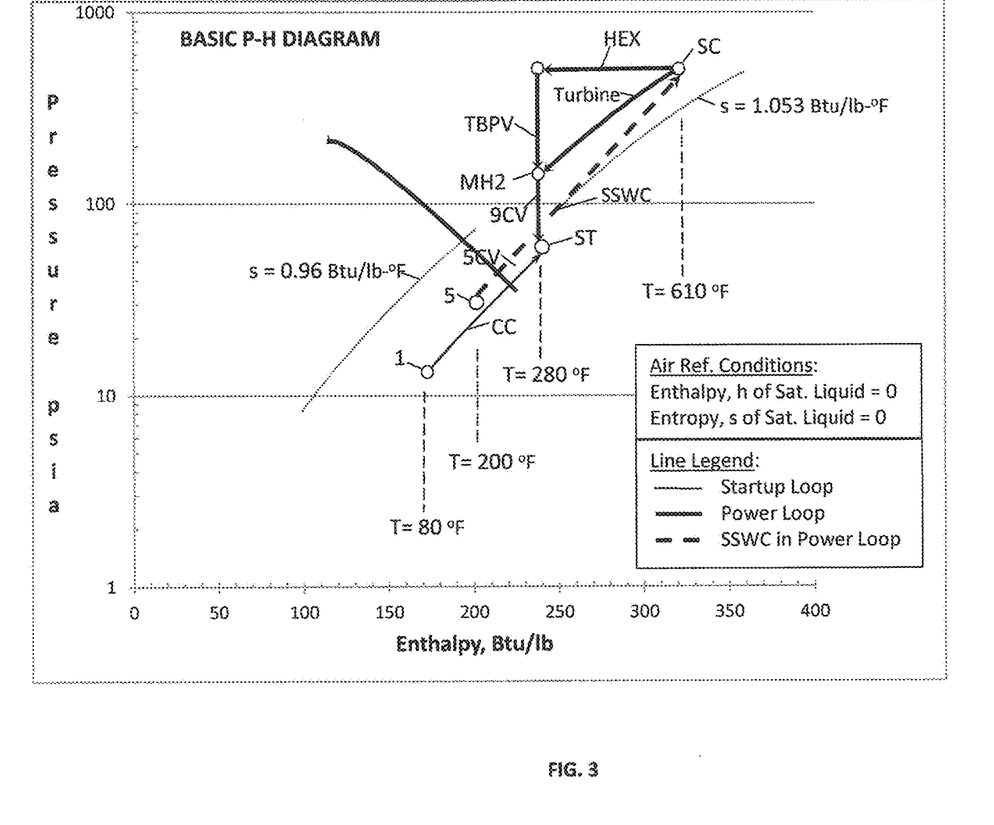
FIG. 3 is an air P-H diagram depicting the basic power plant cycle to estimate the output work capabilities, according to one embodiment of the present invention.

FIG. 3 depicts an air pressure-enthalpy (P-H) diagram of the new cycle, including isentropic and temperature lines. Starting at point 1 in the startup loop, atmospheric air at 14.5 psia is drawn into conventional compressor (CC), wherein the air is compressed isentropically to 60 psia at 280° F., and then directed to storage tank (ST) at which pressure the ST will be maintained. From the ST, the air is routed to the compression apparatus (CA) and velocity choking device 5CV at a minimum flow to control the critical pressure ratio of about 0.52 at point 5 and facilitate non-isentropic compression in the SSWC to about 500 psia at 610° F. for directing to surge cylinder (SC) at which pressure the SC will be maintained. From SC, the air is routed through indirect heat exchanger HEX (FIGS. 4-4B) and the turbine bypass valve TBPV to mixing header MH2 until the air is conditioned to direct to the turbine. From MH2, the air pressure is reduced isenthalpically by control valve 10CV for cycling back to ST.

Figure 4:
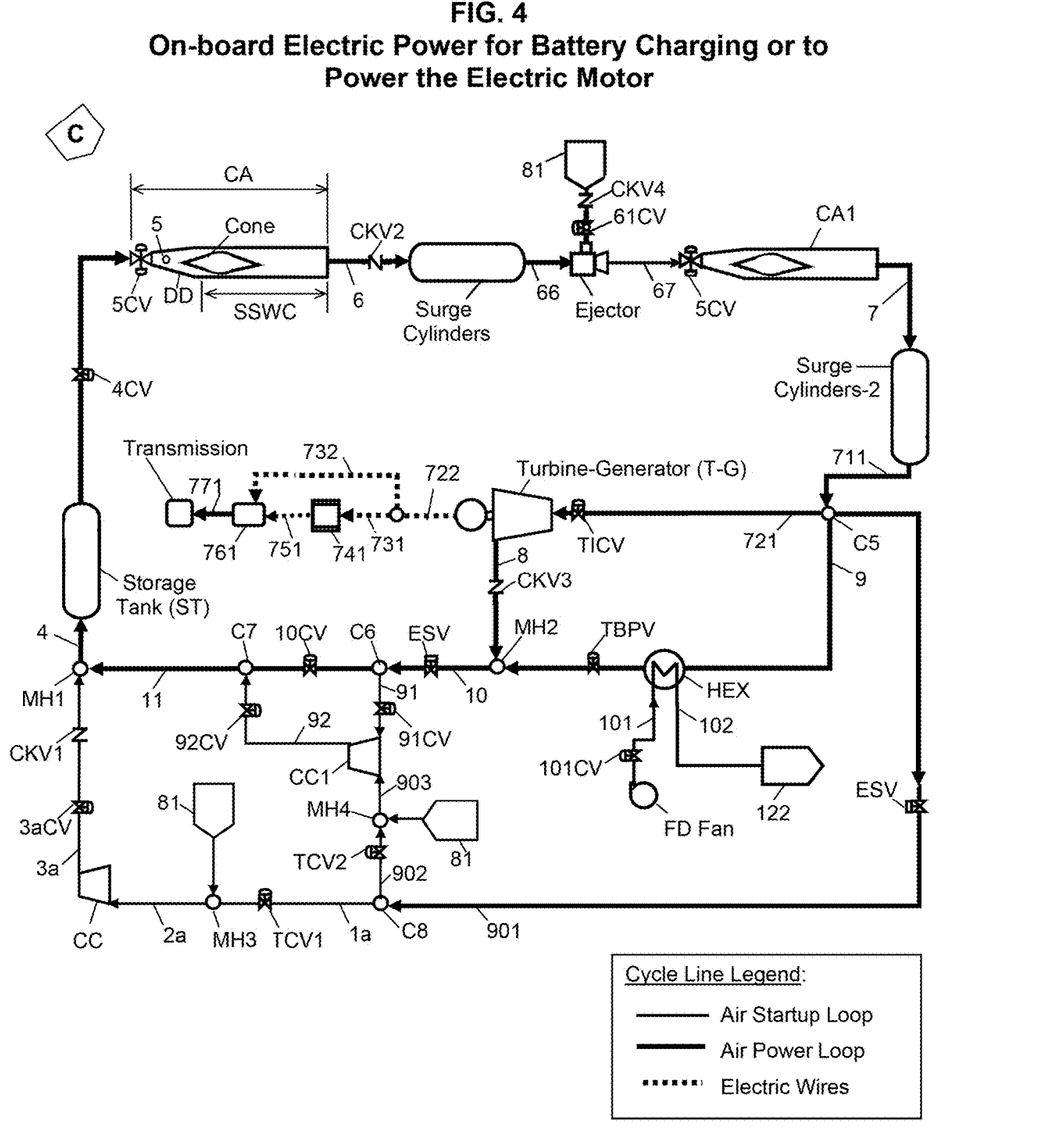
FIGS. 4-4B are alternative power plant flow diagrams for alternate work applications, according to one embodiment of the present invention.
Figure 4A:
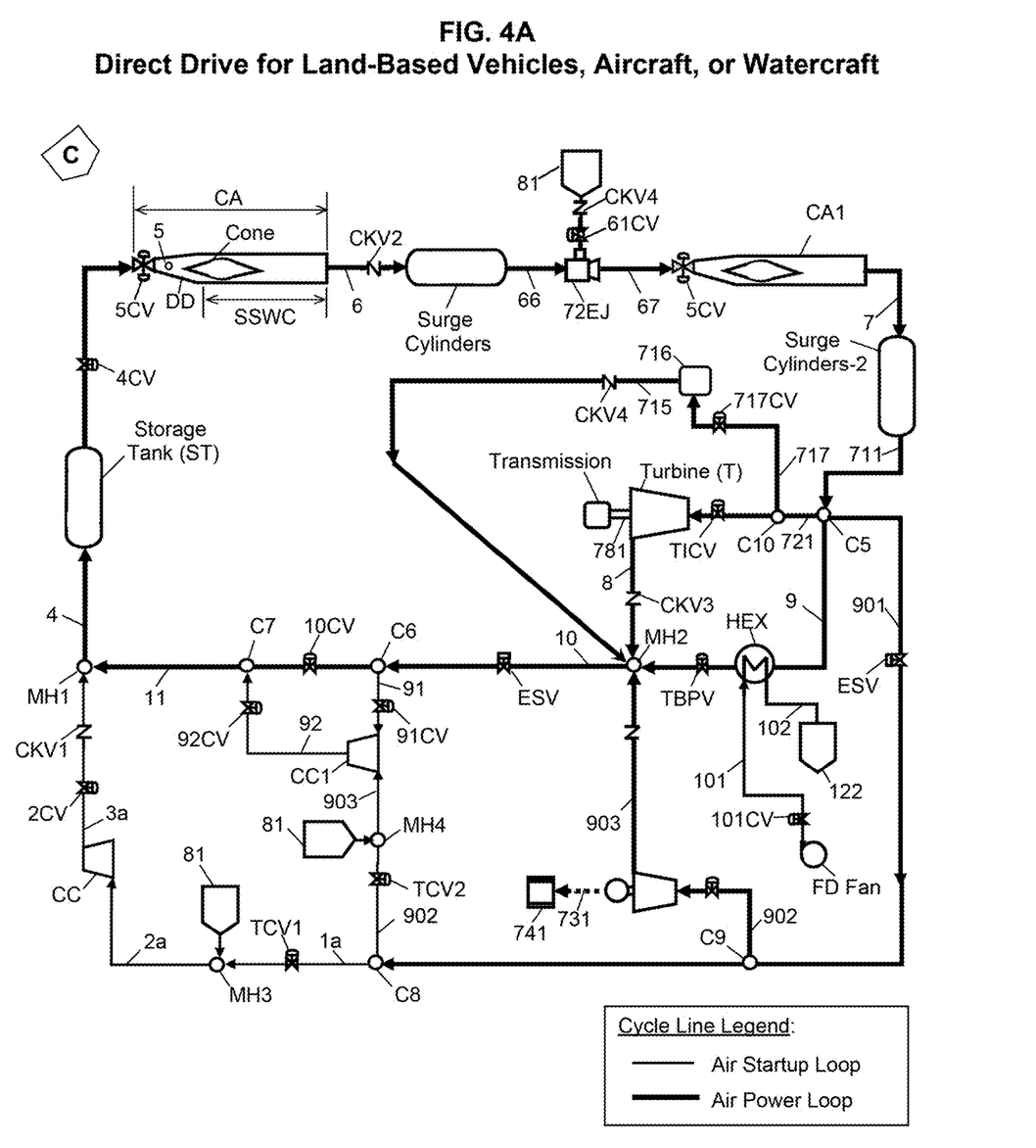
Figure 4B:
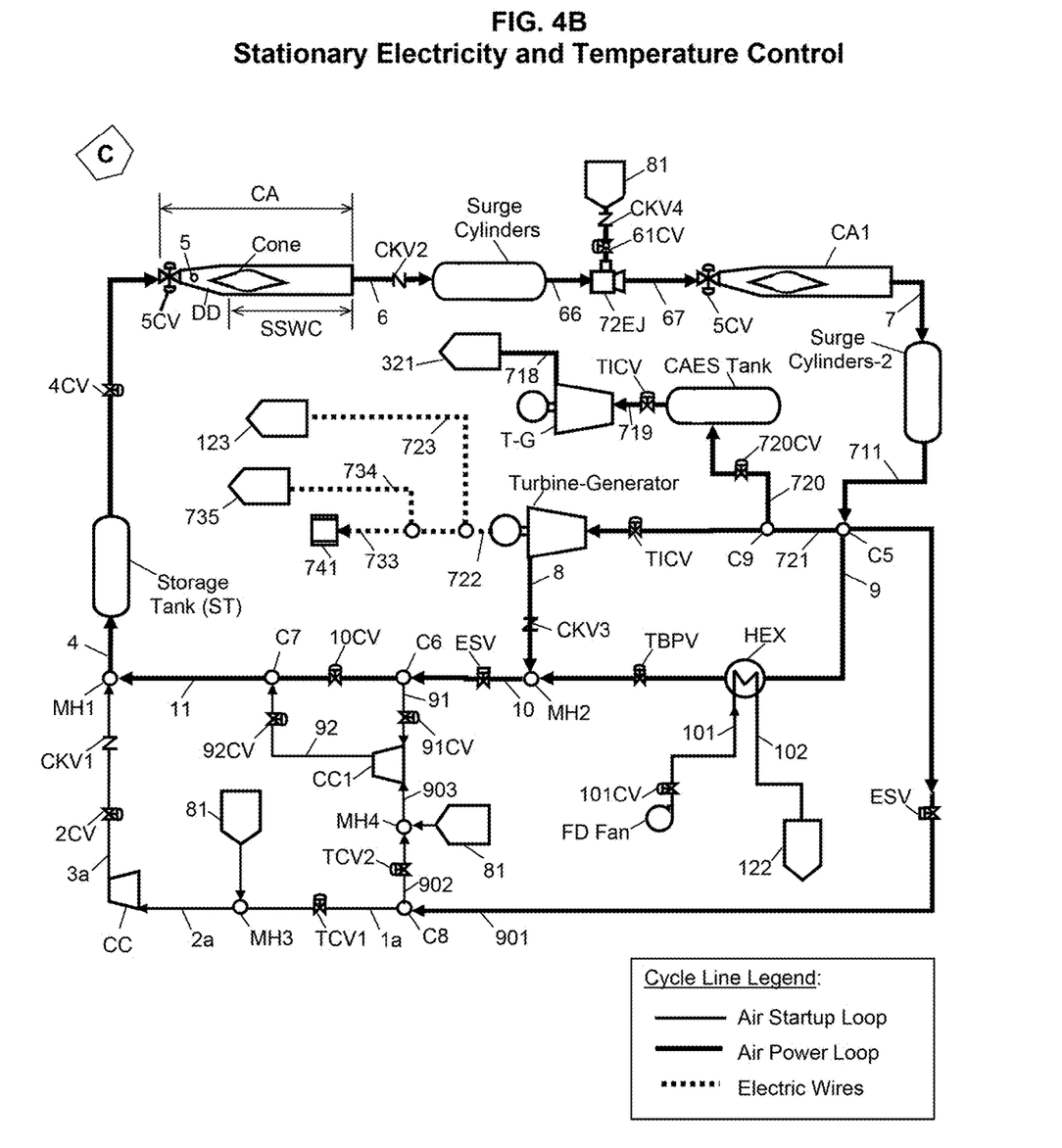

The enhanced power loop cycle illustrated in FIGS. 4, 4A, and 4B produces more net work than the basic power loop illustrated in FIG. 2. The enhanced power loop includes one or more storage tanks, the vapor compression apparatus, one or more surge cylinders, one or more conventional air ejectors, a second set of surge cylinders, a turbine-generator set, and indirect heat exchangers.

The surge cylinders are located between the second compression apparatus and air ejector in order to maintain a sufficient volume of air to minimize pressure fluctuations to the ejector. The surge cylinders provide motive air to the ejector to draw atmospheric into the power loop to increase total power loop mass air flow by more than 50%. The additional air quantity and additional energy provided by the second compression apparatus result in a greater production of net work. The air provided through the ejector also reduces conventional compressor auxiliary power consumption.

One or more indirect heat exchangers (HEX) transfer heat from the power loop for cooling purposes or to provide heat to an outside application.

One or more surge cylinders are located between the second compression apparatus and turbine to maintain a sufficient volume of air to minimize pressure fluctuations, and to minimize large pressure and thermal shocks to the turbine in the event of compression loss. In the event of a power plant trip, an emergency operated shut-off valve located downstream of the turbine and turbine bypass and in the heating loop inlet are quickly closed to isolate the turbine with the surge cylinders; and check valve CKV2 automatically closes. If external or stored power is unavailable during a power plant trip, emergency backup power should be included for the emergency shut-off valve.

Flow is routed from the surge cylinder to the turbine, which isentropically expands the vapor to produce electricity with a shaft-connected generator. The vapor leaving the turbine is routed through an indirect heat exchanger for controlling the power loop temperature or to transfer to an outside application, and then to the mixing header to recombine with the startup loop stream. The heat exchanger controls the vapor temperature, in conjunction with the startup loop portion and tempering air, to near starting conditions entering the compression apparatus. The startup loop portion of the power plant cycle continues to charge the power loop, as discussed earlier, until a desired base load or full load is established; after which, the startup loop portion can be placed in standby mode, since the compression apparatus sustains a desired power loop pressure.

A turbine bypass is provided to ensure that vapor does not enter the turbine until the inlet vapor conditions are suitable. Using the turbine bypass in parallel with turbine operation also provides flow control and compression stability, since maintaining a recirculation mass flow provides more flow to the compression apparatus and increases the compression control range.

FIGS. 4, 4A, and 4B depict multiple applications that can benefit from this enhanced power cycle, including the following:

a. On-board electric power for battery charging or to directly drive the electric motor on land-based electric vehicles, aircraft, and watercraft.
b. Direct mechanical turbine drive for land-based vehicles, aircraft, and watercraft with option to drive an internal combustion engine without fuel.
c. Stationary electricity and temperature control for homes, business, and other structures with a compressed air energy system (CAES) option.
d. Electrical input to a local or the national grid.

With respect to FIGS. 4-4B, the startup loop operates on atmospheric air 81 drawn into conventional oil-free centrifugal or axial compressor CC through line 2a, receiving air from the heating loop as discussed previously for the basic flow diagram. The startup loop and control valve 3aCV provides low pressure compressed air to the power loop through line 3a, control valve 2CV and check valve CKV1 to mixing header MH1, wherein the startup air is mixed with the power loop air from the turbine (T). MH1 is the starting and ending points for the power loop. From MH1, the combined air flow is directed through line 3 to a low-pressure storage tank (ST) and from the ST through line 4 and control valve 4CV to the velocity choking device 5CV in compression apparatus CA. Velocity choking device 5CV controls Mach 1 velocity in multiple CD nozzle throats over a load range. The supersonic air flow velocity created at point 5 enters the divergent duct DD, wherein the air velocity further increases before impinging on the SSWC cone to create supersonic shock waves to compress the air to an elevated level and then directs it to surge cylinders (SC). The surge cylinders provide a volume for stability and pressure fluctuations. From the surge cylinders, the compressed air is routed through line 66 to the conventional air ejector and then through line 67 to a second compression apparatus CA1, and then to a second set of surge cylinders-2 through line 7, and then to header connection C5 through line 711.

Several options are available to apply the turbine output, depending on the apparatus selected to be driven. FIG. 4 depicts the new cycle for installation on-board an electric vehicle (EV) with generator G shaft connected to the turbine with G output wiring 722 and 731 connected to charge battery 741, which provides electrical power to drive the motor 761 through wiring 751, from which a shaft 771 connected to the transmission transmits mechanical power to the EV for driving through wiring 722 and 732. The EV other electrical requirements are also supplied from G or battery 741.

FIG. 4A depicts an option to install the new cycle on-board an electric vehicle with a direct turbine drive for land-based vehicles to drive the wheels, or watercraft and aircraft to drive the propellers. The transmission input shaft 781 is directly connected to Turbine (T). An option is also depicted on FIG. 4A to drive an internal combustion engine without burning fuel. Compressed air is taken from header connection C10 in line 721 through line 717 and control valve 717CV to an inlet manifold on engine 716 and the expanded air is returned through an engine 716 exhaust manifold through line 715 and check valve CKV4 to MH2.

FIG. 4B depicts an option to install the new cycle as a stationary power plant with G output through wiring 722 and 723 to a distribution station 123 for output to a local grid or the national grid. It is to be understood that a startup and backup battery 741 is depicted with charging provisions through lines 722 and 733.

FIG. 4B depicts an option to install the new cycle as a stand-alone unit for electricity and heating for homes, business, and other structures. Electricity supply is received from the generator through lines 722 and 734 to distribution circuit box 735. Startup and backup battery 741 is depicted with charging provisions from line 722 and 733. Heated air for forced air temperature control can be taken from heat distribution station 122 or electrical heating can be provided from 735. Air conditioning electricity can be taken from 735. FIG. 4B also shows electrical output from the generator through lines 722 and 723 to distribution 123 for input to a local or the national grid.

Another unique option is depicted in FIG. 4B. The extra compressed air added into the cycle from the ejector 72EJ can be diverted to a compressed air energy storage system (CAES) power plant to generate electricity during peak demand periods. The air is diverted from connection header C9 through line 720 and control valve 720CV to a CAES tank or a nearby cavern for storage. Then, when more power generation is required, the air is directed from storage through line 719 and turbine inlet control valve TICV to a turbine-generator set (T-G) to produce power, and the air leaving the turbine is vented to atmosphere 321 through line 718.

The SSWC technology is innovatively adapted for stationary use as part of a compression apparatus to provide a renewable energy source and operating conditions in the power cycle. The CD nozzle for air requires a throat critical pressure ratio of about 0.52 for air to achieve Mach 1 velocity and transition flow from subsonic to supersonic velocity.

The air ejectors should be manufactured from materials to withstand the thermal stresses imposed by the differential temperatures of the entrained air and the higher temperature motive force air. Thermal sleeves or inside thermal coatings can be considered for the designs.

As shown in FIG. 4, during startup, before CA is activated and compressing air at its minimum operating range, the air bypasses the turbine T by routing it through line 71, turbine bypass valve (TBPV), and indirect heat exchanger HEX to mixing header MH2 where it mixes with any air leaving the turbine from line 8 through check valve CKV3. Then, the air is routed from MH2 through line 9, emergency shutoff valve ESV, header connection C3, control valve 9CV, header connection C4, and then through line 10 to MH2 where it mixes with the startup loop air.

Prior to loading the turbine, warm air can be introduced from header connection C5, or a nearby connection, to warm and spin the turbine.

After the CA is activated, the turbine can be loaded by routing air from surge cylinders-2 through line 7, header connection C5, line 721, and control valve 721 to the turbine (T). The air temperature leaving the turbine and the TBPV can be reduced in indirect air heater (HEX) to return the air to original design conditions entering the CA or to provide heated air for other applications. HEX is located in selected locations as required by the cycle designs as depicted in FIGS. 4, 5A, and 4B. Atmospheric cooling air is provided to HEX through control valve 101CV and line 101 by a forced draft fan (FD Fan). The heated air from HEX in line 102 is routed to distribution station 122 and can be used for indoor temperature control, other purposes, or vented back to the atmosphere.

Since a large pressure loss is required by 5CV for controlling critical pressure drop and to create supersonic velocity air flow, and before CA is compressing air, another startup loop is included to restore power loop pressure, consisting of conventional compressor CC1 which is placed into service with power from battery 741 (FIG. 4). Air is taken from C3 through line 91 to CC1 to restore the pressure through line 92, control valve 92CV, and C4 with control valve 92CV closed. After CA compresses the air, CC1 is removed from service by reversing the positions of these valves. As a backup service to the HEX cooling loop, CC1 can also be used to temper the power cycle air temperature at C4 by drawing in atmospheric air 81 through line 90 and control valve 90CV and discharging air through line 92 and control valve 92CV to C4.

After warming and spinning the turbine, the turbine inlet valve 721CV is opened to load the turbine and provide power output for the applications depicted in FIG. 4, FIG. 4A, and FIG. 4B or other applications.

Figure 5:
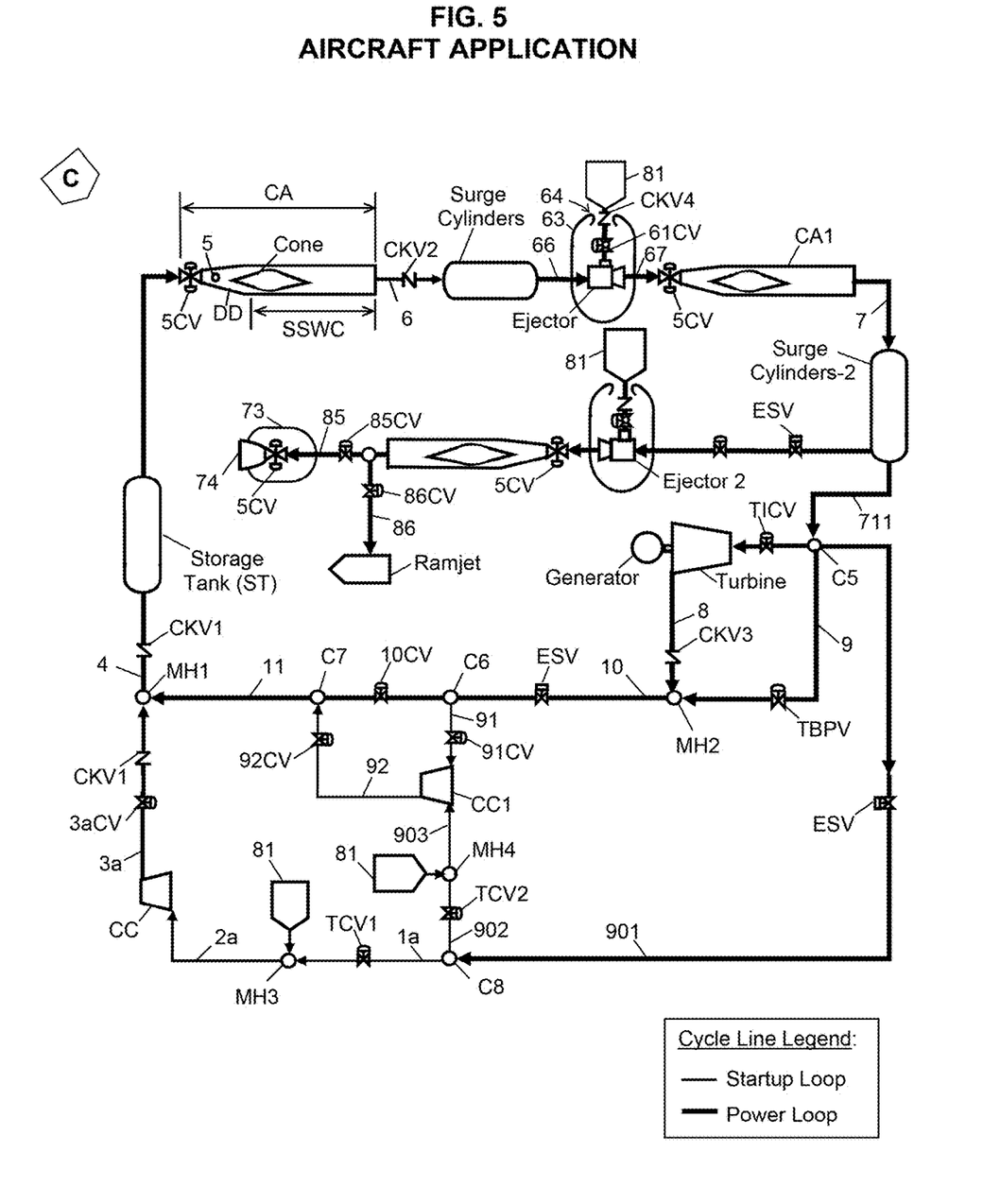
FIG. 5 is another power plant flow diagram for providing jet engine propulsion, according to one embodiment of the present invention.

In another embodiment illustrated in FIG. 5 of the present invention using atmospheric air, this invention may be used on aircraft, depending on the aircraft design, and acceptable size and weight of the compressor. Aircraft with ramjet engines can operate more efficiently at subsonic velocity and can be accelerated to supersonic velocity to facilitate ramjet operation.

Now attention is drawn to FIG. 5 in which the startup and power loops are similar to FIG. 4, except power loop air flow is diverted from the surge cylinder-2 through line 72, emergency shutoff valve ESV, control valve 72CV, conventional ejector, line 65, compression apparatus CA1, control valve 85CV, and line 85 to one or more aircraft engines 73 equipped with a velocity choke control valve 5CV and engine exhaust nozzle 74. Valve 5CV converts air flowing at subsonic velocity to supersonic velocity to enter nozzle 74 for further velocity increase and then exits into the atmosphere at supersonic velocity to provide thrusting power for the aircraft. In order to provide a greater volume of air to engine 73 to produce more thrust, a cylindrical body 63 is depicted for housing the conventional ejector and mounting on the exterior of the aircraft with pitot opening 64 facing the direction of travel to collect atmospheric air from another source of atmospheric air 81 for directing through check valve CKV4 and control valve 61CV to the suction inlet of the ejector. The high-pressure air from the surge cylinder provides the motive force for the ejectors to entrain the flow of atmospheric air into the power cycle at an entrainment ratio of greater than 50%; thereby, increasing air flow to CA1 and engine 73 for increasing thrust.

Supersonic velocity burners with fuel injection (not shown) as currently used by hypersonic aircraft can be added to engine 73 downstream of control valve 5CV to increase thrusting power.

An air ejector, compressor apparatus, and surge cylinders can also be included in line 711 to the auxiliary turbine to increase generator output for compressor CC and CC1 power consumption and to supply additional air to reduce their operating duty.

An alternate path from CA1 is depicted through line 86 and control valve 86CV to a conventional Ramjet aircraft engine combustion chamber. The high-pressure air can be used to complement Ramjet aircraft performance by providing thrust for takeoffs and to improve subsonic flight. The high-pressure air can be injected into the Ramjet engine to aspirate air through the conventional engine inlet; thereby providing additional air for combustion. After aircraft Mach 1 velocity, the high-pressure air from the surge cylinder can be removed from service by closing 72CV or it can be continued to supplement Ramjet performance.

Low pressure air is maintained in the storage tank by CC, CC1, and the air returning from the turbine or turbine bypass. High pressure air is maintained in the surge cylinders by the CA. With increased demand from engine 73, control valve 61CV is opened first to supply atmospheric air 81 before opening control valve 72CV to supply air from the surge cylinders; thereby, reducing CC power consumption.

Also, FIG. 5 differs from the other flow diagrams in that conventional compressor CC and associated piping and valves are part of the power loop to provide makeup air for the air exhausted into the atmosphere from aircraft nozzle 74 and not returned from line 11. Atmospheric air 81 enters CC through line 2a and discharges compressed air through line 3a, control valve 3aCV, and check valve CKV1 to mixing header MH1 to combine with air flow from the auxiliary turbine. Also, tempering air is taken from CC discharge for routing through line 12 and tempering control valve TCV to mixing header MH2 to mix with air flow leaving the turbine or the turbine bypass when cooling is required. Excessive air amounts in the power loop may be vented or used in other applications.

Before startup of the auxiliary turbine-generator, a battery pack (not shown) should be included to operate CC and startup compressor CC1, and after start up, the battery pack can be recharged from the auxiliary turbine-generator. Some may prefer that CC be shaft connected to the auxiliary turbine to reduce power consumption.

The aircraft engine 73 depicted in FIG. 5 and described above uses control valve 5CV as depicted in the flow diagrams to control internal CD nozzle throat choke velocity over a load range to transition air flow from subsonic to supersonic velocity and exhaust into the atmosphere through exhaust nozzle 74 to provide thrust for aircraft. Engine 73 can be capable of producing takeoff power depending on the aircraft design and weight. Otherwise, engine 73 can be used as a hybrid for cruising together with the aircraft fueled engine to extend flight range by reducing fuel consumption, resulting in reduced air pollution. Engine 73 can be used in other applications such as glider type aircraft.

Now directing attention to a Ramjet engine, the NASA Ramjet EngineSim Version 1.7c interactive program available at a NASA website estimates their performance, resulting in core air flows at various aircraft velocities as tabulated below:

| Aircraft Velocity | Elevation, ft. | Lb/sec. | Lb/hour |
|---|---|---|---|
| 175 MPH Take-off | 0 | 18.3 | 65,880 |
| Mach 0.5 | 20,000 | 9.6 | 34,560 |
| Mach 0.5 | 30,000 | 6.2 | 22,320 |
| Mach 0.5 | 40,000 | 3.9 | 14,040 |
| Mach 1 | 40,000 | 6.2 | 23,320 |
| Mach 2 | 40,000 | 23.5 | 84,600 |
| Mach 3 | 40,000 | 96.6 | 347,760 |

FIG. 5 depicts two ejectors and one conventional compressor CC. Assuming that the compressed air flow from CC is 40,000 lb/hr and the ejectors are entraining 50% of the entering motive air mass flow, the air mass flow in Surge Cylinders-2 would be 60,000 lb/hr. Accordingly, the air mass flow leaving the second ejector and entering the ramjet would be 90,000 lb/hr., which can be sufficient to reach about Mach 2 velocity before the Ramjet engine starts normal operation.

The actual air compressor selected is based on operating air mass flow versus the weight and size acceptable to the aircraft design, which also determines the number of air ejectors required for the cycle. Since ambient air temperature can be −80° F. at 40,000 feet, heating air diverted from the power cycle should be considered in air compressor selection.

Estimated calculations are shown below to demonstrate the power capabilities from the turbine output:
The P-H diagram in FIG. 3 shows that the depicted cycle can produce an actual turbine differential enthalpy (Δh) of about 85 Btu/lb when expanding the air isentropically from 500 psia to 60 psia. Assuming the following, find the air mass flow (ṁ, lb/hr) required through the turbine for installing the cycle into an EV:
Turbine-generator output is applied to an electric vehicle that requires 500 kilowatt hours (kwh) of power, where
Turbine efficiency, $\eta_T$=80%
Generator efficiency, $\eta_G$=98%

$$\dot{m}=(500 kw \times 3412 Btu/kw)/(\Delta h \times \eta_T \times \eta_G)=25,600 lb/hr$$

Another example of the cycle capabilities is shown below:
Find the air mass flow (ṁ, lb/hr) required through the turbine for installing the cycle into a 100 net megawatt ($MW_N$) power plant with the same turbine and generator efficiencies:

$$\dot{m}=(100,000 kw \times 3412 Btu/kw)/(\Delta h \times q_T \times \eta_G)=5,120,048 lb/hr$$

The mass flow for the 100 $MW_N$ can be achieved for the basic cycle. Therefore, compared to the above EV calculations, the cycle can be installed on power cars, buses, trucks, trains, units for home electricity supply and temperature control, farm equipment, aircraft, watercraft, medium size power plants, and the like.

A unique aspect of the enhanced cycle in FIG. 4 is that additional net power output capabilities are created with an air ejector. For example, one additional ejector increases the air mass flow by more than 50% per hour and one additional compression apparatus increases the turbine inlet enthalpy and the production of more turbine differential enthalpy, resulting in significantly more cycle net work output. The equipment and the enhanced cycle would have to be designed for the increased flows and conditions accordingly.

Another unique aspect of the present invention is depicted in FIG. 4A as an alternate to using a turbine drive. The compressed air can be used to omit fuel injection in some internal combustion engines by injecting the high pressure-temperature air into the cylinders at top-dead-center (T-D-C) piston positions, which also eliminates engine internal compression and the power consumed during compression. Typical car cylinder pressure ranges from 800 psia at T-D-C to 200 psia at bottom dead center (B-D-C) positions.

It is known that current supersonic shock wave noise attenuation methods can be used for personnel safety and to reduce annoying sounds:
Thicker wall piping
Increase personnel distance from the noise source
Use thermal or acoustic insulation on the pipe
House the piping in Isolated structures with acoustic insulation
Supersonic wind tunnel testing to develop more jet engine thrusting power have demonstrated that noise from eddy currents can be generated above M=2.5 velocity in divergent nozzles with sharp expansion and that the noise can be reduced with small amounts of throat bypass air to the divergent nozzle expanded section.

Benefits resulting from these disclosed innovations are numerous and include the following:

Shock waves are a simple and powerful method to compress gas. This technology is currently well used and understood in supersonic aircraft engine design and is based on shock-wave compression by "ramming" the inlet air, flowing into the inlet duct at or above Mach 1 velocity, into and around a fixed obstructing body. The present invention provides a method to apply SSWC for stationary service and to generate renewable energy. Compression apparatus can be installed in series for the desired output pressure and temperature conditions or installed in parallel for increasing the turndown range.

A scientific challenge facing the world today is finding a method to reduce greenhouse gas emissions. Fossil fired power plants account for around 40 percent of the world's energy-related $CO_2$ emissions and they dominate our electricity supply. There is an urgent need for cost-effective methods to capture and store their carbon emissions. Current carbon capture and storage (CCS) of $CO_2$ are costly since compressing $CO_2$ to about 1400 to 2200 psi for transport and storage with conventional compresses consumes approximately 33 percent of the cost of CCS. The present invention provides a method to reduce the costs of CCS.

Stationary power plants, land-based vehicles, aircraft, and watercraft using this disclosed technology of the present invention would not use fossil, nuclear, or other fuels resulting in considerable savings in electricity costs, reduced air pollution, and low-cost transportation.

Electrical vehicles with on-board charging capabilities would result in independence from charging and refueling stations. Searching for battery recharging stations or using hybrid type vehicles to recharge the battery would not be required. Currently, hybrid type vehicles are powered by an internal combustion engine and one or more electric motors, which are driven by the energy stored in batteries. Generally, a hybrid electric vehicle cannot be plugged into a stationary power source for charging the battery and charging is provided by the internal combustion engine and regenerative braking in direct current (DC) systems. The electric vehicle using the present invention can be operated for a designed time period with power from the battery and during intervals of stop-go driving. Then, the power loop can be placed into service to produce electricity for charging or direct vehicle operation.

An independent or emergency electrical outage generator is provided by the present invention without using fossil fuels that cause environmental pollution. Electric powered tools can be transitioned to battery operation.

Safety is improved and operating costs are reduced by not using gasoline, diesel, and other fuels such as ethanol, propane, hydrogen, and nuclear. However, some may prefer to inject fuel into the cycles of the present invention to boost power output from the turbine and the jet engine.

The new power cycles of the present invention use air as the heat trapping gas, but other heat trapping gases can be used that perform similarly.

The power loop also includes a surge cylinder(Surge Cylinder), wherein the surge cylinder is operatively connected to the vapor compression apparatus (CA) such that the surge cylinder maintains a sufficient volume of compressed air to minimize pressure fluctuations and large pressure and thermal shocks to an auxiliary turbine-generator (Turbine, Generator), wherein the auxiliary turbine-generator is operatively connected to the surge cylinder such that the turbine isentropically expands the air to produce electricity with a shaft-connected generator, and wherein an aircraft with one or more engines 73 includes a velocity choking device 5CV and exhaust nozzle 74 which are operatively connected to the surge cylinder such that the air exits to the atmosphere from the exhaust nozzle 74 at supersonic velocity in order to produce thrust and propel the aircraft forward.

A unique aspect of the present invention is that the renewable energy power plant for a subsonic aircraft for auxiliary power and thrust shown in FIG. 5 includes a startup loop, wherein the startup loop includes a conventional compressor CC to provide a starting pressure, heats of compression, and mass flow to the power loop. The startup loop also includes a conventional compressor CC1 to restore pressure to the power loop during startup before the compression apparatus (CA) is activated. The renewable energy power plant for a subsonic aircraft for auxiliary power and thrust includes the power loop, wherein the power loop includes a flow stream of atmospheric air with a mass flow, a starting pressure, and heat input from the conventional compressor CC and the vapor compression apparatus (CA) heats of compression. The startup loop continues increasing the mass flow to the vapor compression apparatus (CA) located within the power loop until compression is facilitated within the vapor compression apparatus (CA) to generate renewable energy for power and thrust and thereafter to provide makeup air for the air exhausted from the aircraft engine 73. Furthermore, the power loop includes a vapor compression apparatus (CA), wherein the vapor compression apparatus (CA) includes a velocity choking device 5CV located upstream of an adjustable supersonic shock wave compressor (SSWC) wherein the velocity choking device 5CV isentropically transitions air flowing at a subsonic velocity to a supersonic velocity entering the SSWC to facilitate non-isentropic compression and generation of renewable energy for turbine inlet conditions.

Another unique aspect of the present invention is that the renewable energy power plant shown in FIGS. 2, 4, 4A, and 4B includes a startup loop, wherein the startup loop includes a conventional compressor CC to provide a starting pressure, heats of compression, and mass flow to the power loop. The startup loop also includes a conventional compressor CC1 to restore pressure to the power loop during startup before the compression apparatus (CA) is activated. The renewable energy power plant includes the power loop, wherein the power loop includes a flow stream of atmospheric air with a mass flow, a starting pressure, and heat input from the conventional compressor CC and the vapor compression apparatus (CA) heats of compression. The startup loop continues increasing the mass flow to the vapor compression apparatus (CA) located within the power loop until compression is facilitated within the vapor compression apparatus (CA); thereby generating renewable energy for the multiple applications depicted in FIGS. 4, 4A, and 4B.

In cases when pressure vessel design pressure or the specified gas flow causes excessive pipe wall thicknesses, materials can be selected with a higher allowable stress, or the turbine throttle design pressure can be reduced. Outside temperature jacketing can be used to reduce cyclic stresses, but excessive wall thickness can cause a design with less than the specified life cycles. One or more trains of compression apparatus can be installed in parallel to reduce the gas flow, thereby resulting in less diameter and wall thickness. Using more than one compression apparatus in parallel also increases the operating turndown range of the compression apparatus and power plant. The cone, or other flow obstruction, can have internal compartments, drills, or other means to reduce the pressure differential between the internal pressure and the external pressure, thereby resulting in less material thickness.

During a startup, turbine bypass flow is routed from header connection C5 through line 9 (FIG. 2) and turbine bypass valve TBPV to mixing header MH2 and around the power loop until vapor conditions are suitable for introducing to the turbine through the TICV. After startup, the turbine bypass flow can be used in parallel with the turbine flow to provide more flow to the compression apparatus for increasing the compression control range.

The surge cylinder minimizes pressure fluctuations or pressure-temperature shocking conditions in the event of a pressure loss from the compression apparatus. For trip conditions, fast acting shutoff valve ESV in line 8 isolates the turbine with the surge cylinder (FIG. 2) to minimize turbine shocking.

A further unique aspect of the present invention is that other renewable energy or conventional heat input sources may be used with the power plant cycle.

With respect to the P-H diagram in FIG. 3, there is illustrated a graphical depiction of the calculation values and results for the sample calculation below estimating full load net power production, Pn with the basic power loop cycle.

The mass flow from the startup loop is increased to achieve the minimum mass flow of the SSWC required to facilitate compression; thereby, setting the minimum base load of operation. Since the vapor conditions entering the turbine bypass are now at suitable conditions for entering the turbine, the turbine-generator set may be placed into service by transitioning the turbine bypass out of service. With the vapor leaving the turbine bypass, and then the turbine, and the air tempering loop or an indirect air heat exchanger in service, the air conditions in the storage tank are similar to starting conditions.

The SSWC depicted in FIG. 1 is designed for internal compression. Current SSWC technology is available to control the cone to various axial positions in relation to gas flow. For example, during low range operation, the cone can be moved closer to CD nozzles 35 and 36 to reduce the cross-sectional areas of the SSWC compression section and throat, thereby making an adjustable orifice for lower gas flow rates.

In cases when pressure vessel design pressure or the specified gas flow causes excessive wall thicknesses, materials can be selected with a higher allowable stress or the turbine throttle design pressure can be reduced. Outside temperature jacketing can be used to reduce cyclic stresses, but excessive wall thickness can cause a design with less than the specified life cycles. One or more trains of compression apparatus can be installed in parallel to reduce the gas flow, thereby resulting in less diameter and wall thickness. Using more than one compression apparatus in parallel also increases the operating turndown range of the compression apparatus and power plant.

Various other SSWC designs are available, including mixed compression types in which external compression is added prior to entering the SSWC by using an adjustable air inlet cowl or other shock wave focal surface to create external shock waves. Also, the SSWC can have wedge shaped obstructions in lieu of a cone for internal compression using adjustable inclinations to optimize compression.

Instrumentation is currently available to ensure that each nozzle is operating at Mach 1 velocity, including gas flow, sound wave detection, static pressure, and temperature. The intelligent controller can include the following expected curves for comparison to actual measurements as feedback for correcting valve travel positions:
  a. pressure and temperature on a Pressure-Enthalpy diagram
  b. valve travel position versus gas flow
  c. turbine throttle pressure or turbine differential pressure versus megawatts or gas flow Valve body 31 (FIGS. 1-1B) is arranged for assembly by matching the internals to one bonnet 37 and then inserting the internals through the bonnet 37 access opening, mating the internals to the opposite bonnet 37, and then bolting both bonnets 37 in-place to valve body 31 to secure the internals. Cage 32 is further held in-place by valve body 31.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower." "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other modifications and implementations will occur to those skilled in the art without departing from the spirit and the scope of the invention. Accordingly, the description hereinabove is not intended to limit the invention.

I claim:

1. A method of using a renewable energy power plant cycle, wherein the method comprises:
    operating a startup loop, wherein the startup loop includes an air startup flow stream and the startup loop provides a mass flow and a starting pressure to a power loop that is operatively connected to the startup loop, and wherein startup loop continues increasing the mass flow to a first vapor compression apparatus located within the power loop until compression is facilitated within the first vapor compression apparatus to provide the renewable energy and then continue operation to achieve a desired base load by the renewable energy power plant cycle; and
        operating the power loop, wherein the power loop comprises;
        operating the first vapor compression apparatus, wherein the first vapor compression apparatus includes a velocity choking device and a divergent duct located upstream of an adjustable supersonic shock wave compressor (SSWC) wherein the velocity choking device transitions air flowing at a subsonic velocity to a supersonic velocity entering the SSWC by isentropically expanding air flowing at subsonic velocity to supersonic velocity,
        operating a storage tank, wherein the storage tank maintains a pressure in the power loop at a pressure level required by the velocity choking device to transition the air velocity from subsonic to supersonic,
        operating a surge cylinder, wherein the surge cylinder is operatively connected to the first vapor compression apparatus such that the surge cylinder maintains a sufficient volume of air to minimize pressure fluctuations and minimizes large pressure and thermal shocks to a turbine, and
        operating the turbine and a generator, wherein the turbine is operatively connected to the surge cylinder such that the turbine isentropically expands the air to produce electricity through use of the generator.

2. The method according to claim 1, wherein the method further comprises:
    operating a conventional compressor, wherein the conventional compressor is operatively connected to a first source of atmospheric air such that the conventional compressor is capable of charging the power loop with atmospheric air flow and pressure.

3. The method according to claim 1, wherein operating the velocity choking device further comprises:
    operating a choke valve to control a control pressure ratio and a Mach 1 throat velocity to transition the air flowing at a subsonic velocity to a supersonic velocity entering the SSWC in order to simulate an air speed greater than Mach 1,
    wherein the choke valve includes a plurality of nozzles that isentropically expand gas flowing at subsonic velocity to supersonic velocity.

4. The method according to claim 2, wherein the method further comprises:
    routing an air vapor leaving the turbine through an indirect heat exchanger for controlling a temperature of the air vapor;
    routing the air vapor to a first mixing header to recombine the air vapor with the air startup flow stream; and
    A routing a heating loop from the power loop to the conventional compressor to ensure that an entering atmospheric air temperature is above 50° F.

5. The method according to claim 1, wherein operating the power loop further comprises:
    operating a second vapor compression apparatus, wherein the second vapor compression apparatus is located downstream of the surge cylinder.

6. The method according to claim 5, wherein operating the power loop further comprises:
    operating an ejector, wherein the ejector is operatively connected to a second source of atmospheric air and wherein air from the surge cylinder provides a motive force
    wherein the at least one aircraft engine is operatively connected to the second vapor compression apparatus device.

7. The method according to claim 1, wherein operating the power loop further comprises:
    operating a motor, wherein the motor is operatively connected to a battery, wherein the battery is electrically connected to the generator.

8. The method according to claim 4, wherein operating the power loop further comprises:
    operating a fan to provide atmospheric air which is provided to the indirect heat exchanger; and
    routing heated air from the indirect heat exchanger to a distribution station.

9. The method according to claim 1, wherein operating the power loop further comprises:
   operating the generator, wherein a portion of an electricity supply produced by the generator is transmitted to a distribution circuit box; and
   transmitting another portion of the electricity supply produced by the generator to an electrical grid.

10. The method according to claim 5, wherein operating the power loop further comprises:
    operating at least one aircraft engine, wherein the at least one aircraft engine includes a second velocity choking device such that the second velocity choking device converts air flowing at subsonic velocity to supersonic velocity to enter a nozzle of the at least one aircraft engine for further velocity increase and then exits into an atmosphere at supersonic velocity to provide thrusting power for the at least one aircraft engine, and
    wherein the at least one aircraft engine is operatively connected to the second vapor compression apparatus device.

11. The method according to claim 5, wherein operating the power loop further comprises:
    operating a ramjet aircraft engine, wherein the ramjet aircraft engine is operatively connected to the second vapor compression apparatus device.

12. The method according to claim 6, wherein operating the power loop further comprises:
    diverting compressed air added into the power loop cycle from the ejector to a compressed air energy storage system (CAES) power plant to generate electricity during peak demand periods.

13. The method according to claim 6, wherein operating the power loop further comprises:
    A diverting compressed air added into the power loop from the ejector to an internal combustion engine in order to drive the internal combustion engine without burning fuel.

14. A renewable energy power plant, comprising:
    a startup loop, wherein the startup loop includes an air startup flow stream and the startup loop provides a mass flow and a starting pressure to a power loop that is operatively connected to the startup loop, and wherein startup loop continues increasing the mass flow to a first vapor compression apparatus located within the power loop until compression is facilitated within the first vapor compression apparatus to provide renewable energy and then continue operation to achieve a desired base load by the renewable energy power plant cycle; and
    the power loop, wherein the power loop comprises;
    a first vapor compression apparatus, wherein the first vapor compression apparatus includes a velocity choking device and a divergent duct located upstream of an adjustable supersonic shock wave compressor (SSWC) wherein the velocity choking device transitions air flowing at a subsonic velocity to a supersonic velocity entering the SSWC by isentropically expanding air flowing at subsonic velocity to supersonic velocity,
    a storage tank operatively connected to the first vapor compression apparatus, wherein the storage tank maintains a pressure in the power loop at a pressure level required by the velocity choking device to transition the air velocity from subsonic to supersonic,
    a surge cylinder, wherein the surge cylinder is operatively connected to the first vapor compression apparatus such that the surge cylinder maintains a sufficient volume of air to minimize pressure fluctuations and minimizes large pressure and thermal shocks to a turbine, and
    the turbine and a generator, wherein the turbine is operatively connected to the surge cylinder and the generator is operatively connected to the turbine such that the turbine isentropically expands the air to produce electricity through use of the generator.

15. The renewable energy power plant according to claim 14, wherein the renewable energy power plant further comprises:
    a conventional compressor, wherein the conventional compressor is operatively connected to a first source of atmospheric air such that the compressor is capable of charging the power loop with atmospheric air flow and pressure.

16. The renewable energy power plant according to claim 14, wherein the velocity choking device further comprises:
    a choke valve to control a critical pressure ratio and a Mach 1 throat velocity to transition the air flowing at a subsonic velocity to a supersonic velocity entering the SSWC in order to simulate an air speed greater than Mach 1,
    wherein the choke valve includes a plurality of nozzles that isentropically expand gas flowing at subsonic velocity to supersonic velocity.

17. The renewable energy power plant according to claim 15, wherein the renewable energy power plant further comprises:
    an indirect heat exchanger for routing an air vapor leaving the turbine through the indirect heat exchanger for controlling a temperature of the air vapor;
    a first mixing header, wherein the air vapor is routed to the first mixing header to recombine the air vapor with the air startup flow stream; and
    a heating loop, wherein the heating loop is operatively connected to the power loop and the compressor, and wherein the heating loop is configured to ensure that an entering atmospheric air temperature is above 50° F.

18. The renewable energy power plant according to claim 14, wherein the power loop further comprises:
    a second vapor compression apparatus, wherein the second vapor compression apparatus is located downstream of the surge cylinder.

19. The renewable energy power plant according to claim 18, wherein the power loop further comprises:
    an ejector, wherein the ejector is operatively connected to a second source of A atmospheric air and wherein air from the surge cylinder provides a motive for for the ejector to induce flow of atmospheric air into the power cycle in order to increase air flow to the second vapor compression apparatus.

20. The renewable energy power plant according to claim 14, wherein the power loop further comprises:
    a motor, wherein the motor is operatively connected to a battery, wherein the battery is electrically connected to the generator.

21. The renewable energy power plant according to claim 17, wherein the power loop further comprises:
    a fan, wherein the fan provides atmospheric air to the indirect heat exchanger; and
    a distribution station, wherein heated air is routed from the indirect heat exchanger to the distribution station for use in indoor temperature control.

22. The renewable energy power plant according to claim 14, wherein the power loop further comprises:

a distribution circuit box, wherein a portion of an electricity supply produced by the generator is transmitted to the distribution circuit box; and an electrical grip, wherein another portion of the electricity supply produced by the generator is transmitted to the electrical grid.

23. The renewable energy power plant according to claim 18, wherein the power loop further comprises:

at least one aircraft engine, wherein the at least one aircraft engine includes another velocity choking device such that the velocity choking device converts air flowing at subsonic velocity to supersonic velocity to enter a nozzle of the at least one aircraft engine for further velocity increase and then exits into an atmosphere at supersonic velocity to provide thrusting power for the at least one aircraft engine, and wherein the at least one aircraft engine is operatively connected to the second vapor compression apparatus device.

24. The renewable energy power plant according to claim 18, wherein the power loop further comprises:

a ramjet aircraft engine, wherein the ramjet aircraft engine is operatively connected to the second vapor compression apparatus device.

25. The renewable energy power plant according to claim 19, wherein the power loop further comprises:

a compressed air energy storage system (CAES) power plant operatively A connected to the ejector, wherein compressed air added into the power loop from the ejector is diverted to the CAES to generate electricity during peak demand periods.

26. The renewable energy power plant according to claim 19, wherein the power loop further comprises:

an internal combustion engine operatively connected to the ejector, wherein the compressed air added into the internal combustion engine drives the internal combustion engine without burning fuel, for the ejector to induce flow of atmospheric air into the power loop in order to increase air flow to the second vapor compression apparatus.

* * * * *